A. L. PARKER.
PRESSURE FLUID SYSTEM.
APPLICATION FILED SEPT. 1, 1916.
1,315,683.
Patented Sept. 9, 1919.
2 SHEETS—SHEET 2.
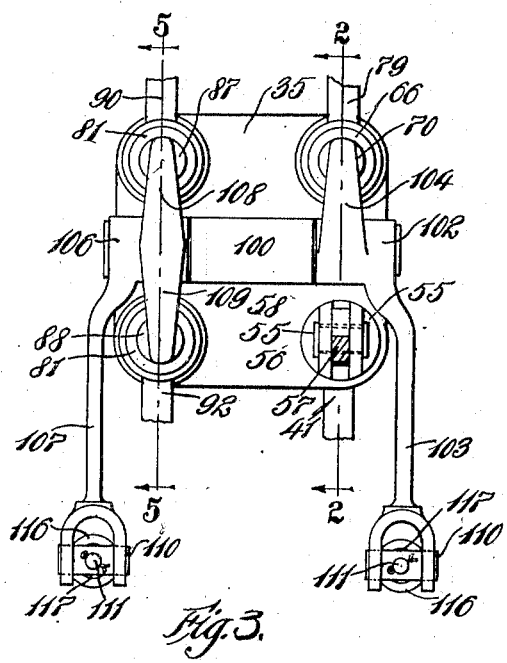
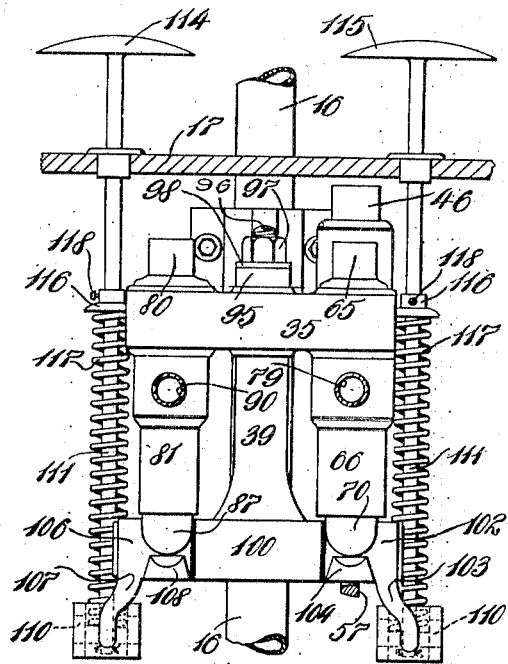
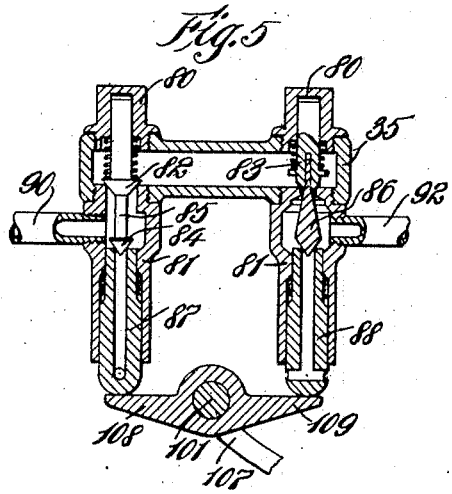
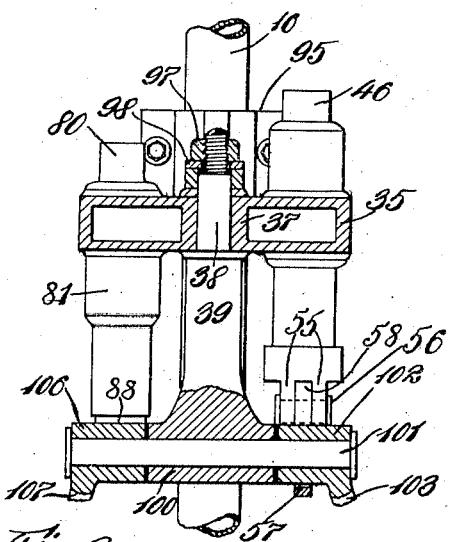
Inventor
Arthur L. Parker
By Hull, Smith, Brock & West
Attys.

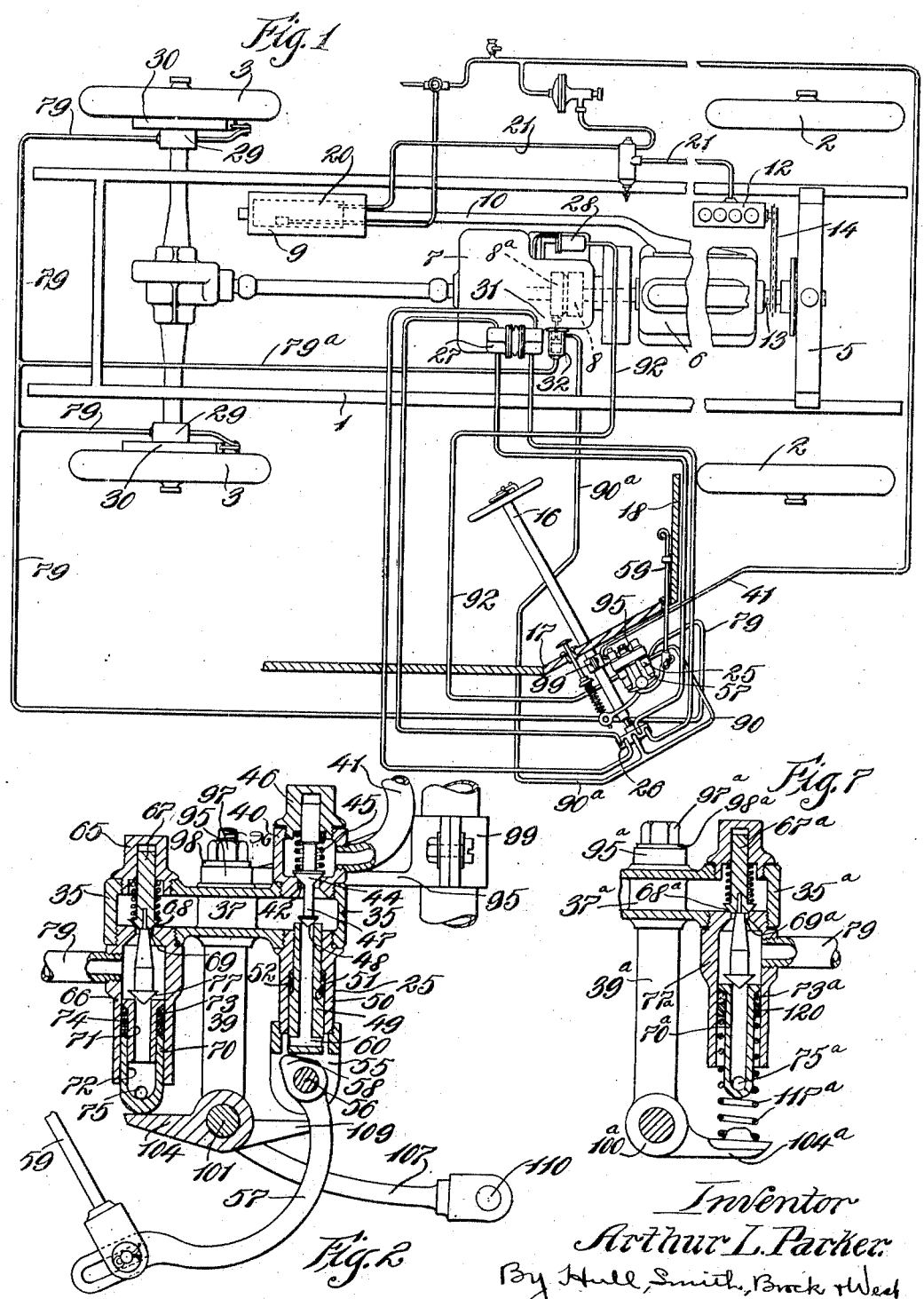

UNITED STATES PATENT OFFICE.

ARTHUR L. PARKER, OF CLEVELAND, OHIO, ASSIGNOR TO THE PARKER APPLIANCE COMPANY, OF CLEVELAND, OHIO, A CORPORATION OF OHIO.

PRESSURE-FLUID SYSTEM.

1,315,683.  Specification of Letters Patent.  Patented Sept. 9, 1919.

Application filed September 1, 1916. Serial No. 117,994.

*To all whom it may concern:*

Be it known that I, ARTHUR L. PARKER, a citizen of the United States, residing at Cleveland, in the county of Cuyahoga and State of Ohio, have invented a certain new and useful Improvement in Pressure-Fluid Systems, of which the following is a full, clear, and exact description, reference being had to the accompanying drawings.

This invention relates to pressure fluid systems, and more particularly to a novel valve for use in connection with such systems.

The pressure fluid system which I have selected as illustrating one application of my invention is that of an automobile and by means of which the clutch, brakes, and gear shifting mechanisms are controlled and actuated, the same being a modification of the inventions set forth in my copending applications for Letters Patent Serial Nos. 857,827 and 42,067 and filed respectively on the 21st day of August, 1914, and the 26th day of July, 1915.

The primary object of my present invention is the provision, with a source of pressure fluid supply, and a pressure fluid system in communicative connection therewith, of means adapted to be operated at will for delivering fluid from the source to the system at any desired pressure, and operative automatically to terminate such delivery when said desired pressure has been attained.

A further object of the invention, expressed in general terms, is the provision of a novel valve which constitutes the aforesaid means for controlling the flow of fluid from the source to the system, and to provide means for opening the valve and for determining its closing resistance, and to provide pressure fluid operated means that is in communicative connection with the system for closing the valve.

Pursuant to the attainment of this same general object, my invention comprehends the use of a resilient element through which the valve aforesaid is opened, and also means coöperating with said element for opening the valve and for determining the tension under which the resilient element is placed in the valve opening operation, and also the provision of pressure fluid operated means in communicative connection with the system for counteracting the effect of the element and thereby allowing the valve to close.

As a further object, my invention has to provide for a hasty exhaust of the system when, at the will of the operator, the means whereby pressure fluid is communicated from the source to the system, is released.

The foregoing objects are attained in a system conventionally illustrated in the accompanying drawings, and through the valve construction shown therein, and wherein Figure 1 represents, diagrammatically, an automobile equipped with a pressure fluid control system involving the valve of my invention; Fig. 2 is an enlarged sectional side elevation through the valve, the same being taken on the line 2—2 of Fig. 3; Fig. 3 is a bottom plan view of the valve; Fig. 4 is an elevation as if looking from the top side of Fig. 3; Fig. 5 is a section on the line 5—5 of Fig. 3, and looking in the direction of the arrows; Fig. 6 is a central section through the valve; and Fig. 7 is a modification.

Describing the parts by the use of reference characters, 1 represents the frame of an automobile, 2 the front or steering wheels thereof, and 3 the rear or driving wheels. 5 is the radiator, 6 the engine, 7 the casing inclosing the clutch and transmission gearing, the driving element of the clutch being represented conventionally in dotted lines at 8, and the driven element at 8ª. 9 is the muffler which has connection with the exhaust pipe 10 of the engine, and 12 is an air pump which is driven from the crank shaft 13 of the engine through the chain 14. 16 is the steering column of the automobile (which is shown in the diagram in side elevation and as removed from the frame of the automobile), the same having associated with it the floor and dash represented respectively at 17 and 18.

The essential elements of the pressure fluid control system are the reservoir 20, which is shown in dotted lines as incorporated within the muffler 9, and which is supplied with air from the pump 12 through the pipe 21. The valve which constitutes the subject matter of the present application is shown at 25, and, while it consists of a unit comprising a plurality of valves, it may be termed, by reason of its function, the distributing valve. As will appear presently, the various valves involved in this unit are those through which the pressure fluid mechanisms of the system are controlled. 26 represents a selecting valve that is associated with the gear shifting mechanism, represented at 27. 28 is the clutch actuating mechanism, and 29, 29 represents the brake cylinders through which the brakes 30, 30 are operated. A clutch brake is shown conventionally at 31 as coöperating with the driven clutch element 8ª. This brake is under the control of mechanism consisting of a cylinder 32 inclosing a piston, the rod whereof carries at its outer end the shoe which constitutes the clutch brake and to which the reference numeral 31 is applied.

Passing now to the detailed description of the distributing valve unit 25, the same consists of a hollow casing 35 that is practically square in plan, as shown in Fig. 3, and which has alining, tapped holes in its top and bottom sides at each corner. Also, the casing has a central boss 37 through which a bore extends for the reception of the reduced upper end 38 of a post 39, the purpose of which will be presently explained. A valve, or more accurately speaking, a set of two valves, is supported by each corner of the casing, and they will now be taken up for consideration.

The first valve of the unit to be described is the one through which a supply of pressure fluid may be admitted to the casing 35 from the source of pressure fluid represented by the reservoir 20. Within the upper threaded hole of that corner of the casing which supports the valve in question is screwed the reduced lower end of a valve casing 40 with which communication is established from the reservoir 20 through the pipe 41. An orifice 42 is formed in the end wall of the valve casing 40 that is screwed into the casing 35, and a conical valve 44 is arranged to close this orifice, when acted upon by a spring 45, confined between the head of the valve and the opposed wall of a cap 46 which closes the upper end of the casing 40. The stem of the valve 44 is guided within a central recess of the cap 46, and projecting beyond the conical end of the valve 44 is a reduced shank 47, carrying a valve head 48 for coöperation with the end of a tubular piston 49, reciprocable within a sleeve 50, that has its upper end threaded into the lower tapped hole of that corner of the casing 36 with which we are now concerned. It will be observed that the opposite ends of the piston 49 are of different diameters, thus producing a shoulder 51 that is preferably tapered, the enlarged portion of the bore of the sleeve 50 extending beyond the corresponding portion of the piston and containing a packing element 52, preferably of pressed leather. Packing of this nature is found to constitute a very effective seal between the relatively movable parts, and one which is very durable. A bifurcated head 55 is screwed onto the lower end of the sleeve 50, and between the branches of the head there is pivoted upon the pin 56 a lever 57 having a cam head 58 for coöperation with the lower end of the piston 49. When the lever 57 is drawn upward by means of the rod 59, the cam head 58 will be rocked in a direction to elevate the piston 49, and through it, the composite valve 48, 44, so that the latter valve will be raised from its seat against the tension of the spring 45, thus allowing pressure fluid to pass into the casing 35. The lever 57 with its head 58 is so designed that when the lever is pulled upward a predetermined distance, the cam portion of its head will pass beyond the vertical center of the pin 56 and hold the piston 49 elevated.

At this point it may be explained that when the lever is returned to normal position, allowing the piston 49 to drop to the position shown in the drawings and the valve 48 to resume its seat, the piston 49 will move away from the valve 48 allowing the pressure fluid within the casing 35 to exhaust through the hollow piston and the exhaust ports 60 formed in the lower end thereof.

Screwed into the upper and lower holes that occur on the same side of the casing with the valve just described, and shown in the section of Fig. 2, are the cap 65 and the sleeve 66, respectively. The cap 65 is substantially identical with the cap 46 and the same has a recess within which the stem 67 of a valve 68 is adapted to reciprocate. The valve 68 coöperates with the end wall of the sleeve 66 surrounding the orifice 69 through which communication is established between the interior of the casing 35 and said sleeve. A piston 70 is reciprocable within the sleeve 66, and the same is herein shown as a composite piston, the same being made up of elements 71 and 72. The element 71 telescopes within the element 72 and its upper end is of a diameter to correspond to the outside diameter of the element 72 so that a space is formed between the upper end of the element 72 and the preferably inclined shoulder of the enlarged upper end of the element 71 in which a packing is placed which consists of two rings of packing material, preferably leather, and designated 73, and which are separated by a metal ring 74. The lower end of the piston is provided with an exhaust port 75. From a functional standpoint, the composite piston may be considered as an integral unit, for the two elements thereof are movable in unison and carry the packing 73. A valve 77 coöperates with the upper end of the piston 70, and the stem of this valve is attached to the valve 68 so that said valves move in unison at all times. The chamber formed within the upper end of the sleeve 66, above the piston 70, has communication with the brake cylinders 29 through the pipes 79. A branch 79ª leads from one of the pipes 79 to the rear end of the clutch brake cylinder 32, so that when pressure fluid is delivered to the brake actuating cylinders 29, it is simultaneously conducted to the rear end of the clutch brake cylinder 32.

The valves carried by the opposite corners of the casing 35 are practically identical with each other, the same differing only in area; and they include features common to both the valves already described, and which will be easily discernible as the description proceeds. Because of the similarity between the valves already described and those which will now be discussed, a brief description will suffice.

Within the upper tapped hole of each of the remaining corners of the casing 35 is screwed a cap 80, and within the lower hole is screwed the threaded upper end of a sleeve 81. The flow of fluid into the left hand sleeve of Fig. 5 is controlled through a valve 82, and the flow to the other sleeve through the valve 83. A valve 84 is carried by the valve 82, through the stem extension 85, and a valve body 86 is carried in a similar manner by the valve 83. The valve 84 coöperates with the upper end of a hollow piston 87 and the valve 86 with the upper end of a like piston 88. When the valve 82 is opened, pressure fluid is permitted to pass into the upper end of the adjacent sleeve 81 and through the pipe 90 to the selecting valve 26 and thence to the gear operating mechanism 27, by way of the various pipes through which the selecting valve and gear operating mechanism are communicatively connected. Through a branch 90ª of the pipe 90, pressure fluid is simultaneously delivered to the front end of the clutch brake cylinder 32, and sets free the driven element 8ª of the clutch during the gear shifting operation, for a purpose presently to be explained. The valve 83 controls the flow of pressure fluid into the upper end of its respective sleeve 81 and through the tube 92 to the clutch operating mechanism 28.

The unit 25 is adapted to be supported from a convenient part of the machine, as, for instance, the steering column 16, through a bracket 95 having a hollow boss through which the reduced end of the post 39 passes, the upper end of the reduced portion being threaded at 96 for the application of a nut 97 and washer 98, whereby the casing 35 and post 39 may be securely clamped to the bracket, the opposite end of the bracket being shown as provided with means 99 for attachment to the steering column. The lower end of the post 39 is formed with a transverse bearing 100 in which a stub shaft 101 is mounted, said shaft having journaled upon one of its ends the hub 102 of a valve actuating member comprising an arm 103 and a tappet 104, the latter extending beneath the piston 70 of what may be referred to as the brake valve, for it will be remembered that it is this valve which controls the flow of fluid to the brake cylinders. The opposite end of the shaft 101 has journaled upon it the hub 106 of a valve actuating member comprising the arm 107, and the oppositely extending tappets 108 and 109, the former extending beneath and adapted to coöperate with the piston 87 of the valve through which the gear shifting mechanism is operated, and the latter beneath and for coöperation with the piston 88 of what may be termed the clutch valve. The free end of each of the arms 103 and 107 is forked, and each branch of each fork is provided with an aperture which is adapted to contain one end of an oscillating head 110, which has a central transverse bore through which the lower end of a rod 111 is adapted to reciprocate. The rods 111 extend upward through the floor of the automobile, and the one through which the arm 107 is adapted to be rocked is designated 114, while the one that is operatively connected to the arm 103 is designated 115. A collar 116 is secured to each rod 111, and a spring 117 is interposed between said collar and the flattened side of the respective head 110. The collars 116 are secured to the rods 111 by set screws 118, thus providing for an adjustment of the collars along the rods, and consequently an adjustment of the springs 117, if occasion requires.

A brief description of the operation of the system will make clear the action of the various valves of the unit 25. Previous to this description it may be said that when the automobile is not in use, it is desirable to have the valve 44 closed so as to cut off the supply of pressure fluid from the reservoir to the system, thus reducing to a minimum the possibility of leakage.

When the operator enters the car, he pulls upward on the rod 59, thereby rocking the lever 57 and actuating, through its cam head 58, the valve 44, thus throwing the interior of the casing 35 in communication with the source of pressure fluid supply. He then makes his gear selection through the selecting valve 26 and depresses the button 114, thereby rocking the tappet 108 upward to unseat the valve 82 and allowing pressure fluid to pass through the tube 90, the selecting valve, and certain of the tubes leading therefrom, to the gear shifting mechanism 27. It will be noted that the orifice wherewith the valve 82 is associated is comparatively large so that the air may pass quickly to the gear shifting mechanism and accomplish its work promptly. At the same time, pressure fluid is admitted to the front end of the clutch brake cylinder 32 and, acting upon the piston within said cylinder, moves said piston rearwardly to withdraw the shoe of the brake 31 from engagement with the driven element 8ª of the clutch allowing such element to rotate idly under the influence of the driving element 8 wherewith it has, even in fully released condition, a slight, dragging engagement, as is common to practically all automobile clutches. The passive rotation thus imparted to the driven clutch element, and through it, to the transmission gears which are connected to said element, is sufficient to prevent the ends of the teeth of the shifted gears from becoming lodged against the ends of the teeth of the moving gears, thus assuring an easy and positive meshing of the gears, and eliminating an annoying incident which very frequently occurs in prevailing constructions. The tappets 108 and 109 being integral, it is clear that when the tappet 108 is elevated, the one 109 is lowered, compelling the clutch valve 83 to remain closed and insuring the clutch cylinder being exhausted and the clutch therefore released, while the gear shifting operation is in progress. Upon a release of the button 114, the valve 82 is allowed to resume its seat, and the tappet 109, being now elevated, acts upon the piston 88 to open the clutch valve 83. Attention is called to this fact, however, that the valve 82 is closed and the tappet 109 is in contact with the piston 88 of the clutch valve some time before the spring 117 has returned the button 114 to the extreme limit of its upward movement. Now the degree to which this valve is opened depends upon the extent to which the button 114 is allowed to rise above the point where it ceases to actuate the valve 82. It may be explained here that it is my plan in all of my fluid pressure automobile control systems to hold the clutch in effective condition by means of the pressure fluid, utilizing a spring for rendering the clutch ineffective. It is therefore clearly an advantage to deliver the pressure fluid to the clutch in properly modified quantities in order to gradually engage the clutch and avoid a jerk which would otherwise occur. This end is readily accomplished through the mechanism of my present invention. For instance, suppose that the pressure within the reservoir, and consequently that within the casing 35, is fifty pounds, and that I wish to permit only ten pounds to act upon the clutch. I therefore hold the button 114 depressed to such an extent that the valve 83 is barely lifted off of its seat. As a consequence of this a given quantity of the pressure fluid passes into the upper end of the sleeve 81 and through the tube 92 to the clutch actuating mechanism and as soon as the desired pressure is attained, such pressure will act upon the upper end of the piston 88, forcing said piston downward against the tension of the spring 117, through the intervention of connecting mechaism, allowing the valve 83 to be seated by means of its spring 83ª. Thus an automatic means is provided for closing the valve 83 when the desired pressure within the system has been attained regardless of the high pressure that prevails at the source of supply. When it is desired to slightly increase the pressure within the system, thus to further actuate the clutch, the button 114 may be further elevated, and as soon as the additional pressure is attained, the valve will again automatically close and such pressure will be maintained within the system.

Let it now be supposed that it is desired to again shift the gears. This is accomplished, after the gears have been selected in the manner already described, by depressing the button 114, thus closing the clutch valve and opening the valve 82. When the tappet 109 has been removed from the lower end of the piston 88, the piston is permitted to leave the valve 86, the same being encouraged by the pressure fluid within the system, the pressure fluid thereafter escaping through the piston 88 to the atmosphere. This same explanation applies to all the valves of the unit.

The gradual introduction or delivery of the pressure fluid into the system is as essential in connection with the operation of the brakes as it is in connection with the operation of the clutch just described. Therefore, the valve 68 (which I have already termed the brake valve) may be operated through the spring 117 that is compressed by the button 115, precisely as the valve 83 is operated through the intervention of the other spring 117 by the button 114. It is necessary, however, that the brakes engage more promptly than the clutch and I therefore make the orifice 69 controlled by the valve 68 larger than that controlled by the valve 83. The brakes may be held at any desired tension dependent upon the extent to which the button 115 has been depressed and the extent to which the corresponding spring 117 is thereby placed under tension, the pressure fluid within the brake system and sleeve 66 acting upon the piston 70 to counteract the effect of the spring and close the valve when the desired pressure is attained. The brake system is promptly exhausted by releasing the button 115, thus allowing the valve 68 to seat, and the upper end of the piston 70 to leave the valve 77, the exhaust fluid taking its course through the piston and ports 75 thereof to the atmosphere.

I have already explained how the clutch brake 31 is rendered effective to arrest the rotation of the driven clutch element 8ª simultaneously with the actuation of the brakes 30. This is obviously an advantage for it arrests the movement of all driving parts between the clutch and driving wheels, just as soon as the driving wheels are stopped, thus relieving the transmission and differential gearing and shafts of undue strains.

The same principle is involved in the modification shown in Fig. 7 as that incorporated in the various valves hereinbefore described. The essential difference between the two forms of the invention consisting in the location of the resilient element or spring through which the valve is actuated. In the present embodiment, a spring 117ª is interposed between the tappet 104ª and a ring 120 which surrounds the piston element 70ª and is spaced a sufficient distance below its enlarged upper end to provide a space for the accommodation of packing 73ª. It will be seen from this construction that when the valve is mechanically opened by the elevation of the tappet 104ª, it may be subsequently closed by the pressure fluid within the sleeve 77ª, acting upon the piston 70ª, to compress or counteract the effect of the spring 117ª. The remaining elements of the modified form of valve unit being the same as the corresponding elements of the previously described forms, like reference characters, augmented by the exponent "a," are used to designate the corresponding parts of the two forms.

Having thus described my invention, what I claim is:—

1. The combination of a valve casing having an inlet port that is adapted for communicative connection with a source of pressure fluid supply, the casing having also an outlet passageway through which the casing may be placed in communicative connection with a pressure fluid system, a valve body closing the inlet port, a second valve body connected to and movable with the first, a member for engagement with the second valve body for moving the first valve body, through the intervention of the second, from closing position, said member having a port through which the casing may be exhausted, said port being adapted to be closed by the second valve body when the member is moved into engagement therewith.

2. The combination of a valve casing having an inlet port and an outlet passageway, the former being adapted for communicative connection with a source of pressure fluid supply and the latter with a pressure fluid system, the casing having a tubular extension that is substantially in axial alinement with the inlet port, a valve body for closing the inlet port, a second valve body connected to and movable with the first, an element reciprocable within the tubular extension of the casing for coöperation with the second valve body and for moving the first valve body, through the intervention of the second, from closing position, said element having a port through which the casing may be exhausted, said port being adapted to be closed by the second valve body when the element is moved into engagement therewith.

3. A valve unit of the character set forth comprising a hollow casing, a plurality of valve casings communicatively connected to the hollow casing, a valve within each casing, an actuating element for each valve, and valve operating mechanism carried by said casing for coöperation with said elements.

4. A valve unit of the character set forth comprising a hollow casing, an inlet valve casing communicatively connected therewith, a plurality of outlet valve casings communicatively connected with the first casing, valves within said casings, actuating element for said valves, a bearing element supported by the casing, and members supported by said bearing element for coöperation with the valve actuating elements.

5. In an automobile control system, the combination of a source of pressure fluid supply, vehicle brake operating mechanism, gear shifting mechanism, clutch brake operating mechanism adapted to be actuated by pressure fluid to render the same either effective or ineffective, communicative connections between said source and said mechanisms, and means for delivering pressure fluid from the source to the vehicle and clutch brake operating mechanisms to render said mechanisms effective substantially simultaneously, or for delivering pressure fluid from the source to the gear shifting mechanism and to the clutch brake operating mechanism for rendering the latter ineffective during the operation of the former.

6. The combination of a valve casing having an inlet port and an outlet port separated by a partition having an aperture, a valve for closing said aperture, the casing having a cylindrical extension substantially in axial alinement with the aperture, a second valve coupled with the first valve, and a tubular piston within said cylindrical extension and through which the casing may be exhausted, said piston being adapted to be moved into engagement with the second valve and through the intervention thereof open the first valve, the second valve serving the while to close the bore of the piston.

In testimony whereof I hereunto affix my signature.

ARTHUR L. PARKER.